Jan. 25, 1927.
E. SACK
ANTISKIDDING DEVICE
Filed March 27, 1926
1,615,235
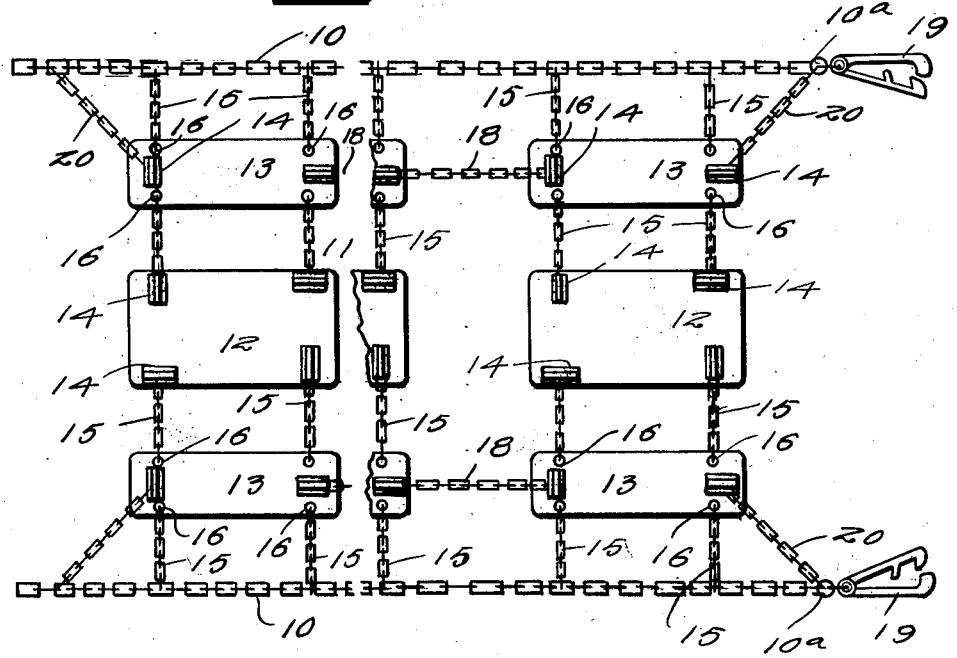
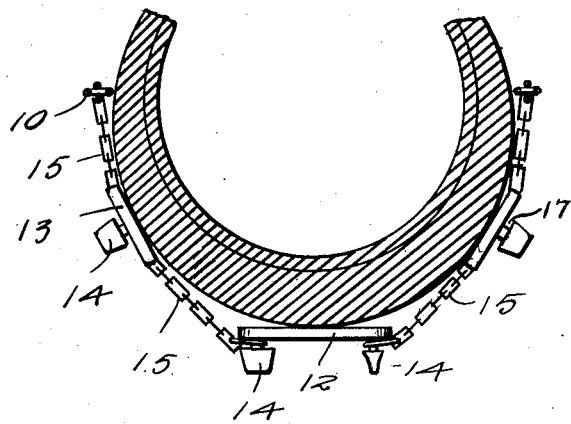
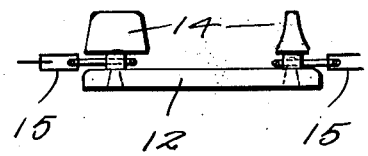
Inventor
Earl Sack
By Watson E. Coleman
Attorney Patented Jan. 25, 1927.

1,615,235

UNITED STATES PATENT OFFICE.

EARL SACK, OF FLINT, MICHIGAN.

ANTISKIDDING DEVICE.

Application filed March 27, 1926. Serial No. 97,967.

This invention relates to anti-skidding devices for vehicle wheels and more particularly to a device of this type consisting of wheel encircling chains and series of plates supported from these chains and adapted to extend transversely of the tread of the vehicle tire.

An important object of the invention is to provide novel and improved means for connecting certain corresponding plates of these series to one another so that they tend to move in unison, the end plates of the plates so constructed being connected to the side chains so that movement thereof is prevented and the entire plate series thus held against movement longitudinally of the tire.

A further object of the invention is to provide in a device of this character, where the plates are provided with calks for preventing side slipping thereof, a construction such that the calks themselves provide a means for securing the connections between adjacent plates.

These and other objects I attain by the construction shown in the accompanying drawing, wherein for the purpose of illustration is shown a preferred embodiment of my invention and wherein:—

Figure 1 is a plan view of an anti-skidding mechanism constructed in accordance with my invention;

Figure 2 is a sectional view showing the anti-skidding mechanism applied to a tire;

Figure 3 is a side elevation of one of the plates.

Referring now more particularly to the drawing, the numeral 10 indicates circumferential side chains connected at spaced points by a transversely extending series 11 of calk bearing plates. These plates include center plates 12 adapted to seat upon the center of the tread of the vehicle tire and side plates 13 adapted to engage this tread adjacent the sides thereof. The plates 12 are relatively wide and are provided with four calks 14 arranged adjacent the four corners of the plate. These calks are relatively thin and flat and are so arranged as to provide a maximum grip for preventing both longitudinal and side slipping of the plates. In the present arrangement, one calk at each end of the plate is arranged transversely of the plate while the opposite calk is arranged longitudinally of the plate. The calks at opposite ends of the plate are reversed in their arrangement so that with either the side or end of the plate in engagement with the ground, traction is provided and side slipping is prevented. The plates 13 are relatively narrow and have arranged thereon two calks 14, one being disposed adjacent each end of the plate, the calks at the opposite ends of the plate being arranged at right angles to one another. The plates of each series are connected by short lengths of chain 15 extending between adjacent plates of the series and between the outer edges of the plates 13 and the side chains 10.

The plates 13 are provided at their side edges adjacent opposite ends thereof with openings 16 in which the ends of the chains 15 which are connected therewith are engaged. The connection between these chains 15 and the plate 12 is provided by forming the calk adjacent the plate with a reduced neck 17 with which the end links of the chain section 15 may be engaged. Corresponding plates 13 of the series 11 are connected in series by short chains 18, the end links of which are engaged with the reduced neck 17 of the calks 14 of these plates. As is well known, the side chains 10 of this type of anti-skidding device are provided at their ends 10ᵃ with a connector 19 and the end series 11 of plates at each end of the side chains is slightly spaced from the ends of the chain and has the ends of the plates adjacent the ends of the side chains connected to such ends of the side chains by diagonally extending chains 20, one end link of which is engaged in a link of the slide chain 10ᵃ and the opposite end of which is engaged with the reduced neck 17 of the end calk of the adjacent plate 13. These diagonally extending chains tend to tighten the connections between the plates 13 at opposite sides of the anti-skidding device and to prevent longitudinal movement thereof during travel of the vehicle. Since the chains 15 between these plates 13 and the plates 12 are relatively short, it follows that the plates 12 will have but little, if any, movement when the device is in applied position.

It will, of course, be obvious that the construction hereinbefore set forth is capable of a certain range of change and modification without materially departing from the spirit of the invention and I accordingly do not limit myself to such specific structure except as hereinafter claimed.

I claim:—

1. An anti-skidding element comprising side chains, a plurality of transversely extending series of calk bearing plates connecting said side chains including center and side plates, flexible connections between the center and side plate of each series and between the side plates of each series and the adjacent side chains, all of said plates having calks the calks of the center plates providing a means for attaching thereto the flexible connections whereby it is connected in its series.

2. An anti-skidding element comprising sides chains, a plurality of transversely extending series of calk bearing plates connecting said side chains including center and side plates, flexible connections between the center and side plate of each series and between the side plates of each series and the adjacent side chains, all of said plates having calks and connections between corresponding side plates of the series whereby the side plates move in unison and a diagonal connection between the side plates of the end series and the adjacent side chain, the calks of said side plates providing means for attaching said connections.

In testimony whereof I hereunto affix my signature.

EARL SACK.